United States Patent
Moisin

[19]

[11] Patent Number: 6,157,142
[45] Date of Patent: Dec. 5, 2000

[54] HID BALLAST CIRCUIT WITH ARC STABILIZATION

[75] Inventor: Mihail S. Moisin, Brookline, Mass.

[73] Assignee: Electro-Mag International, Inc., North Scituate, Mass.

[21] Appl. No.: 09/173,519

[22] Filed: Oct. 15, 1998

[51] Int. Cl.⁷ .................................................. G05F 1/00
[52] U.S. Cl. ............................ 315/307; 315/291; 315/224
[58] Field of Search .................................. 315/225, 119, 315/308, 309, 307, 224, 291

[56] References Cited

U.S. PATENT DOCUMENTS

| | | | |
|---|---|---|---|
| 3,732,460 | 5/1973 | Wattenbach | 315/123 |
| 3,989,976 | 11/1976 | Tabor | 315/291 |
| 4,103,209 | 7/1978 | Elms | 315/207 |
| 4,107,579 | 8/1978 | Bodine, Jr. et al. | 315/205 |
| 4,204,141 | 5/1980 | Nuver | 315/311 |
| 4,287,454 | 9/1981 | Feuersanger et al. | 315/178 |
| 4,331,905 | 5/1982 | Owen | 315/225 |
| 4,339,692 | 7/1982 | Lasecki et al. | 315/277 |
| 4,350,935 | 9/1982 | Spira et al. | 315/291 |
| 4,356,433 | 10/1982 | Linden | 315/308 |
| 4,373,146 | 2/1983 | Bonazoli et al. | 315/209 R |
| 4,378,514 | 3/1983 | Collins | 315/276 |
| 4,414,493 | 11/1983 | Henrich | 315/308 |
| 4,437,043 | 3/1984 | Pitel | 315/308 |
| 4,455,510 | 6/1984 | Lesko | 315/263 |
| 4,503,364 | 3/1985 | Engel | 315/308 |
| 4,745,341 | 5/1988 | Herres | 315/176 |
| 4,763,044 | 8/1988 | Nuckolls et al. | 315/176 |
| 4,810,936 | 3/1989 | Nuckolls et al. | 315/119 |
| 4,890,041 | 12/1989 | Nuckolls et al. | 315/225 |
| 4,904,903 | 2/1990 | Pacholok | 315/209 R |
| 4,958,107 | 9/1990 | Mattas et al. | 315/289 |
| 4,959,593 | 9/1990 | Joanino | 315/290 |
| 5,003,231 | 3/1991 | Perper | 315/291 |
| 5,036,256 | 7/1991 | Garrison et al. | 315/308 |
| 5,051,665 | 9/1991 | Garrison et al. | 315/287 |
| 5,084,801 | 1/1992 | El-Hamamsy et al. | 361/277 |
| 5,118,994 | 6/1992 | Byszewski et al. | 315/240 |
| 5,134,345 | 7/1992 | El-Hamamsy et al. | 315/248 |
| 5,138,231 | 8/1992 | Iida et al. | 315/73 |
| 5,225,742 | 7/1993 | Beasley | 315/307 |
| 5,227,762 | 7/1993 | Guidette et al. | 340/310 |
| 5,319,285 | 6/1994 | Wang et al. | 315/289 |
| 5,321,338 | 6/1994 | Nuckolls et al. | 315/290 |
| 5,339,005 | 8/1994 | Byszewski et al. | 315/244 |
| 5,357,173 | 10/1994 | Kachmarik et al. | 315/209 R |
| 5,391,966 | 2/1995 | Garrison | 315/308 |
| 5,424,617 | 6/1995 | Garbowicz et al. | 315/289 |
| 5,428,268 | 6/1995 | Melis et al. | 315/247 |

(List continued on next page.)

FOREIGN PATENT DOCUMENTS 0361748  4/1990  European Pat. Off. .

*Primary Examiner*—David Vu
*Assistant Examiner*—Tuyet T. Vo
*Attorney, Agent, or Firm*—Nutter, McClennen & Fish, LLP

[57] ABSTRACT

A HID ballast includes a control circuit that minimizes arc instability associated with acoustic resonance of a lamp energized by the ballast. In one embodiment, the ballast includes an inverter circuit having first and second switching elements coupled in a half bridge configuration. A first control circuit controls the conduction state of the first switching element and a second control circuit controls the conduction state of the second switching element. The second control circuit includes a limiting circuit that limits the pre- and post-ignition energy levels to the lamp. One feature of the invention limits the lamp current amplitude such that the lamp can be driven while in acoustic resonance. In another embodiment, the inverter circuit includes a resonant inductive element and a resonant capacitive element which is coupled in parallel with the lamp. The resonant capacitive element has a temperature-dependent impedance characteristic so as to alter the resonant frequency of the inverter circuit as the circuit heats up prior to ignition of the lamp. As the resonant capacitive element heats up the resonant frequency of the inverter increases which increases a voltage applied to the lamp until an arc is initiated. Another feature of the invention limits the average voltage applied to the lamp before and after ignition. A further feature limits the voltage applied to the lamp on a cycle by cycle basis.

34 Claims, 2 Drawing Sheets

U.S. PATENT DOCUMENTS

| | | | |
|---|---|---|---|
| 5,444,334 | 8/1995 | Speaker et al. | 315/209 CD |
| 5,449,980 | 9/1995 | Kiefer et al. | 315/240 |
| 5,569,984 | 10/1996 | Holtslag | 315/307 |
| 5,572,093 | 11/1996 | Kiefer | 315/289 |
| 5,594,308 | 1/1997 | Nuckolls et al. | 315/290 |
| 5,606,222 | 2/1997 | Cottaar et al. | 315/58 |
| 5,623,187 | 4/1997 | Caldeira et al. | 315/307 |
| 5,677,602 | 10/1997 | Paul et al. | 315/224 |
| 5,684,367 | 11/1997 | Moskowitz et al. | 315/246 |
| 5,723,951 | 3/1998 | Byszewski et al. | 315/174 |
| 5,925,986 | 7/1999 | Moisin | 315/247 |
| 5,942,860 | 8/1999 | Huynh | 315/307 |
| 5,962,985 | 10/1999 | Buij et al. | 315/224 |

HID BALLAST CIRCUIT WITH ARC STABILIZATION

CROSS REFERENCE TO RELATED APPLICATION

Not Applicable.

STATEMENT REGARDING FEDERALLY SPONSORED RESEARCH

Not Applicable.

FIELD OF THE INVENTION

The present invention relates to ballast circuits and more particularly to ballast circuits for energizing high intensity discharge lamps.

BACKGROUND OF THE INVENTION

High intensity discharge (HID) lamps are typically coupled to a ballast which provides an alternating current (AC) signal to the lamps. To ignite the lamps, the ballast must apply a relatively high voltage, 2 kilovolts for example, which initiates an electric arc between the lamp terminals. After ignition of the lamp, the ballast provides operational signal levels for sustaining the electrical arc which is the source for light emitted by the lamp.

One type of ballast known as a magnetic ballast includes a magnetic element, such as a laminated iron core. Magnetic ballasts energize HID lamps with a signal having a frequency at or near the incoming power signal, e.g., 60 Hertz. While magnetic ballasts may provide generally reliable operation, they are relatively inefficient due to the low frequency drive signal. Furthermore, magnetic ballasts incur substantial heat loss which further decreases the operating efficiency.

In an effort to overcome these disadvantages, attempts have been made to replace magnetic ballasts with electronic ballasts. Electronic ballasts receive the low frequency power line signal and provide a relatively high frequency drive signal to the lamp. Due to the high frequency operation of the circuit, electronic ballasts are significantly more efficient than magnetic ballasts.

One problem associated with energizing HID lamps with a high frequency signal occurs when the ballast drives the lamp at a frequency which results in acoustic resonance of the lamp. In general, acoustic resonance refers to arc instability which manifests itself as light flickering. In the extreme, acoustic resonance can generate signal levels which can cause the lamp to explode. The frequency at which acoustic resonance occurs depends upon a number of factors such as the lamp dimensions, gas density, and operating temperature. To avoid acoustic resonance, HID ballasts are typically designed to provide a lamp current which has a frequency greater than about 20 kHz. Despite efforts to achieve a desired operating frequency, over time the ballast may provide a drive signal having a decreased operating frequency that may cause the lamp to enter acoustic resonance. Also, lamp parameter variations due to manufacturing limitations, to changing conditions of the lamp components, and to other contributing factors, can cause the lamp to operate at acoustic resonance.

A further disadvantage associated with electronic ballasts occurs when a lamp fails to ignite. In general, the ballast must apply a relatively high voltage signal, e.g., 2 kV to the HID lamp to initiate an arc. However, for a lamp that fails to ignite, some ballasts generate voltages that may ultimately increase to potentially destructive levels.

It would, therefore, be desirable to provide an HID ballast that minimizes arc instability associated with acoustic resonance. It would also be desirable to provide an HID ballast that avoids applying excessive voltage levels to a lamp that fails to light.

SUMMARY OF THE INVENTION

The present invention provides a ballast circuit that limits the energy levels supplied to a lamp. Although the invention is primarily shown and described in conjunction with limiting signal levels to a high intensity discharge (HID) lamp in acoustic resonance, it is understood that the circuit has other applications as well, such as motors and voltage regulators.

In one embodiment, a ballast for energizing a HID lamp includes first and second switching elements having conduction states controlled by respective first and second control circuits. The control circuits alternatively bias the first and second switching elements to conductive and non-conductive states so as to provide an AC signal to the lamp. The first control circuit includes a third switching element coupled to the first switching element for selectively transitioning the first switching element to a non-conductive state for limiting the energy applied to the lamp. In one particular embodiment, the third switching element is biased to a conductive state when the lamp current amplitude for any given cycle becomes greater than a predetermined level. The conductive third switching element causes the first switching element to transition to a non-conductive state thereby limiting or regulating the lamp current on a cycle by cycle basis. And by limiting the lamp current, arc instability due to acoustic resonance is minimized so as to allow continued operation of the lamp.

In another feature of the invention, the third switching element is biased to a conductive state when the average lamp voltage is greater than a predetermined threshold. In one embodiment, the lamp current is rectified so as to charge a capacitor. When the voltage on the capacitor increases above a certain level, the third switching element is biased to a conductive state which turns the first switching element off to reduce lamp voltage levels.

In a further embodiment, the HID ballast limits the voltage applied to a lamp that fails to ignite. The ballast circuit includes a resonant circuit, which includes a resonant capacitor, for providing the AC signal to the lamp. In one embodiment, the resonant capacitor has a temperature dependent impedance characteristic. After the circuit is energized, the temperature of the resonant capacitor increases which alters the impedance so as to concomitantly increase the characteristic resonant frequency of the resonant circuit. The increase in the overall resonant frequency results in a higher voltage being applied to the lamp until it ultimately ignites, i.e., an electric arc is initiated.

In another feature of the invention, the ballast limits the voltage applied to the lamp when it fails to ignite and repeats a start up sequence. Where the lamp fails to ignite, the voltage provided to the lamp by the resonant circuit continues to increase due to the resonant nature of the circuit. When the voltage increases above a predetermined level, the third switching element transitions to a conduction state which results in the first switching element turning off for reducing or terminating the voltage to the lamp. In one embodiment, an inductive bias element is inductively coupled to a resonant inductive element, which forms a part of the resonant circuit. When the current through the resonant inductive element, which corresponds to the lamp current, induces a voltage on the bias element that is above a selected level, the third switching element becomes biased to a conduction state that shuts down the circuit.

During the time that the lamp is not energized, the resonant capacitor decreases in temperature. When the third switching element allows the first switching element to become conductive, the circuit begins to resonate and apply a voltage to the lamp. The resonant capacitor impedance changes so as to increase the resonant frequency of the circuit which increases the voltage applied to the lamp. The lamp voltage increases until the lamp ignites or until the voltage becomes greater than the predetermined level which again shuts down the circuit.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
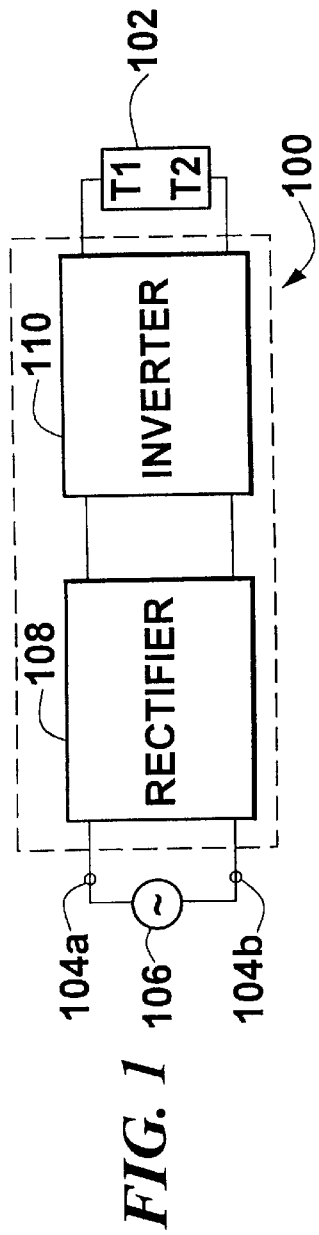
FIG. 1 is a schematic block diagram of a ballast circuit in accordance with the present invention.

FIG. 1 shows a ballast circuit 100 for energizing a high intensity discharge (HID) lamp 102. The ballast 100 includes first and second input terminals 104a,b coupled to an AC energy source 106. The ballast circuit 100 receives a relatively low frequency signal from the AC energy source 106 and provides a relatively high frequency signal to the lamp 102 for causing the lamp to emit visible light. As described below, the ballast 100 is effective to provide stabilization and control over the lamp current so as to minimize the generation of potentially destructive energy levels associated with acoustic resonance.

The ballast 100 includes a rectifier 108 for receiving the relatively low frequency signal from the AC energy source 106 and providing a DC signal to an inverter circuit 110. The inverter 110 is effective to energize the lamp 102 with a high frequency signal that generates a sufficiently high voltage to initiate and sustain an electric arc between the lamp terminals T1,T2.

Figure 2:
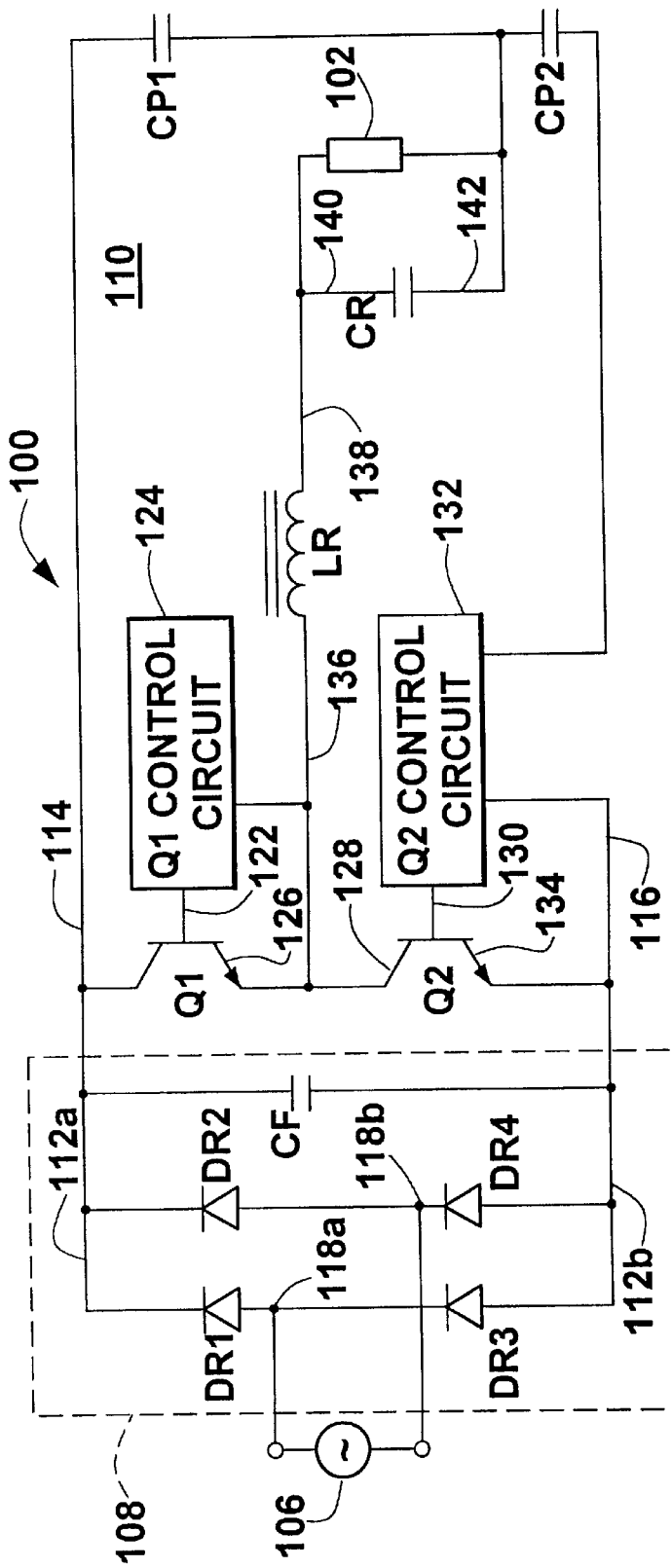
FIG. 2 is a circuit diagram of an exemplary implementation of the circuit of FIG. 1.

FIG. 2 shows an exemplary embodiment of the ballast 100 of FIG. 1. The rectifier 108 is a full bridge rectifier formed from first, second, third, and fourth rectifying diodes DR1–4. The first and third diodes DR1,DR3 are coupled end to end between first and second DC output terminals 112a,b of the rectifier which correspond to positive and negative rails 114,116 of the inverter 110. The second and fourth diodes DR2,DR4 are also coupled end to end between the output terminals 112a,b of the rectifier. The AC energy source 106 has a first terminal 118a coupled to a point between the first and third diodes DR1,DR3 and a second terminal 118b coupled to point between the second and fourth diodes DR2,DR4. A filter capacitor CF can be coupled between the rectifier output terminals 112a,b. The rectifier is effective to provide respective DC signals for energizing the positive and negative rails 114,116 of the inverter 110.

The inverter 110 is shown as a resonant inverter having first and second switching elements Q1,Q2 coupled in a half bridge configuration. The first switching element Q1, shown here as a transistor, has a first or collector terminal 120 coupled to the positive rail 114 of the inverter, a second or base terminal 122 coupled to a first control circuit 124 for controlling the conduction state of the first switching element, and a third or emitter terminal 126 coupled to a first or collector terminal 128 of the second switching element Q2. The second switching element Q2 has a second or base terminal 130 coupled to a second control circuit 132 for controlling the conduction state of the second switching element Q2 and a third or emitter terminal 134 coupled to the negative rail 116 of the inverter.

A resonant inductive element LR has a first terminal 136 coupled to a point between the first and second switching elements Q1,Q2 and a second terminal 138 coupled to a first terminal 140 of a resonant capacitor CR to which the lamp 102 is coupled in parallel. A second terminal 142 of the resonant capacitor CR is coupled to a point between first and second bridge capacitors CP1,CP2 which are coupled end to end between the positive rail 114 of the inverter and the second control circuit 132.

In one embodiment, the resonant capacitor CR has a thermally dependent impedance characteristic. That is, the capacitance of CR corresponds to the temperature of the capacitor. In one particular embodiment, the capacitance of CR decreases as the operating temperature increases. As described below, the heat dependent nature of the capacitor CR alters the characteristic resonant frequency of the circuit which can be used to implement a repeating start up sequence in the case where the lamp fails to light.

The resonant capacitor CR can be provided, for example, as a ceramic-type capacitor formed from materials known as Y5R, Y5U, and Z5U. These capacitors provide a capacitance that "rolls-off" as the temperature increases.

Figure 3:
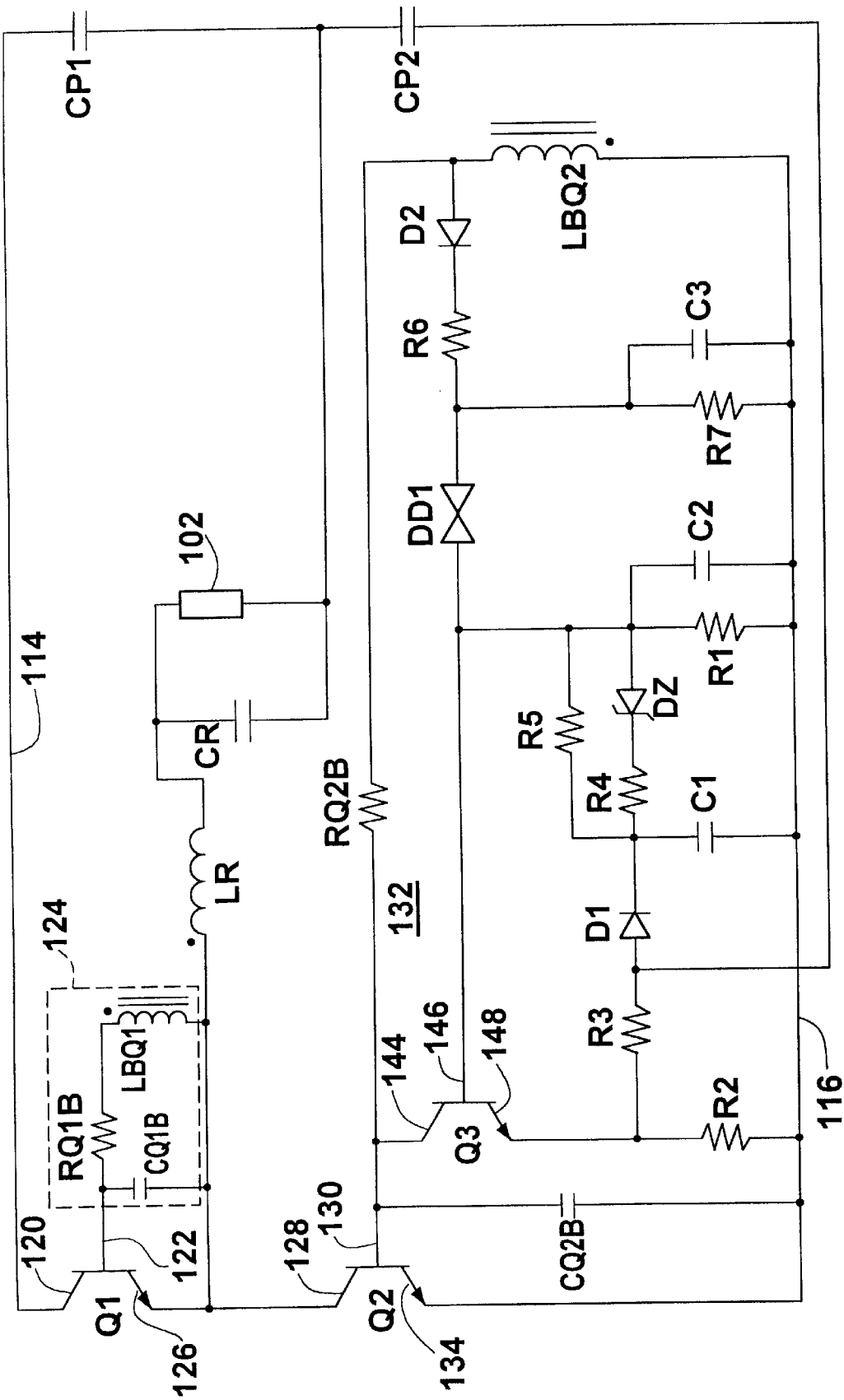
FIG. 3 is a circuit diagram showing further details of the circuit of FIG. 2.

FIG. 3 shows an exemplary circuit implementation of the first and second control circuits 124,132 of FIG. 2, wherein like reference designations indicate like elements. The first control circuit 124 includes a first inductive bias element LBQ1, which is inductively coupled to the resonant inductive element LR, connected to the base terminal 122 of the first switching element Q1 via a resistor RQ1B. The polarity of the first inductive bias element LBQ1 with respect to the resonant inductive element LR is indicated with conventional dot notation. A capacitor CQ1B is coupled between the base terminal 122 and the emitter terminal 126 of the first switching element Q1.

As known to one of ordinary skill in the art, the first bias element LBQ1 alternately biases the first switching element Q1 to conductive and non-conductive states based on the direction of current through the resonant inductive element LR. Due to the resonant operation of the circuit, current through the lamp 102 and the resonant inductive element LR periodically reverses direction. For a first part of the resonant cycle, the first switching element Q1 is conductive as current flows from the resonant element LR to the lamp 102. And for the second part of the resonant cycle, the second switching element Q2 is conductive as current flows from the lamp 102 to the resonant element LR to the negative rail 116.

The second control circuit 132 includes circuitry corresponding to that of the first control circuit 124 for alternately biasing the second switching element Q2 to conductive and non-conductive states. That is, a second inductive bias element LBQ2, which is inductively coupled to the resonant element LR, is connected to the base terminal 130 of Q2 via a resistor RQ2B and a capacitor CQ2B is coupled between the base terminal 130 and the negative rail 116. As described above, the second bias element LBQ2 alternately biases the second switching element Q2 to conductive and non-conductive states to facilitate resonant operation of the circuit and thereby provide a relatively high frequency AC signal to the lamp 102.

The second control circuit 132 includes additional circuitry for controlling signal levels generated by the circuit. A third switching element Q3, shown as a transistor, has a collector terminal 144 coupled to the base terminal 130 of the second switching element Q2, a base terminal 146 coupled to the negative rail 116 via a first resistor R1, and an emitter terminal 148 coupled to the negative rail 116 via a second resistor R2. A series circuit path extends from the emitter terminal 148 of Q3 to a third resistor R3, a first diode D1, a fourth resistor R4 and a zener diode DZ, to the base terminal 146 of Q3. A fifth resistor RS is coupled in parallel with the series-coupled fourth resistor R4 and zener diode DZ. A first capacitor C1 has one end coupled to a point between the first diode D1 and the fourth resistor R4 and the other end coupled to the negative rail 116. A second capacitor C2 is coupled in parallel with the first resistor R1 between the negative rail 116 and the base terminal 146 of Q3.

The second control circuit 132 further includes circuitry for limiting the voltage applied to the lamp 102. A diac DD1, a sixth resistor R6 and a second diode D2 form a series circuit path extending from the base terminal 146 of the third switching element Q3 to the unmarked end of the second bias element LBQ2.

As the circuit is initially energized, i.e., start-up, the first and second switching elements Q1,Q2 are alternately conductive to provide an AC signal to the lamp 102. The resonant capacitor CR has an initial capacitance which corresponds to the temperature of the capacitor at start-up. As the signal levels in the circuit increase due to the resonant nature of the circuit, the rising current level through the resonant capacitor CR results in a corresponding increase in the temperature of CR. And as the temperature of the resonant capacitor CR continues to increase its capacitance decreases. This decrease in capacitance alters the characteristic resonant frequency of the circuit. More particularly, the decrease in capacitance results in an increase of the resonant frequency of the inverter such that voltage and current levels at the resonant capacitor CR increase.

The signal levels in the circuit increase until the third switching element Q3 operates to limit the current amplitude on a cycle basis, the average voltage, and/or the voltage level on a cycle basis. It is understood that prior to ignition of the lamp 102, the current primarily flows through the resonant capacitor CR, and that after lamp ignition the current primarily flows through the lamp.

The average lamp voltage is limited by selectively turning the third switching element Q3 ON. The signal through the second and third resistors R2,R3, which corresponds to current flowing through the resonant capacitor CR before ignition and to current through the lamp after ignition, is rectified by the first diode D1 so that the first capacitor C1 begins to store charge. When the first capacitor C1 voltage level becomes greater than a predetermined level, which corresponds to a threshold voltage associated with the zener diode DZ, the third switching element Q3 is biased to a conductive state by the voltage applied to the base terminal 146 thereof. And when the third switching element Q3 is ON, the second switching element Q2 is OFF which reduces the power applied to the resonant capacitor CR.

The signal through the resistors R2,R3 is also limited on cycle-by-cycle basis. When the current has an amplitude greater than a predetermined level, a negative potential, which is applied to the emitter terminal of Q3 as a result of current through the third resistor R3, is effective to bias the transistor Q3 to a conductive state. Thus, the third switching element Q3 turns the second switching element Q2 OFF on a cycle basis to limit the current, i.e., the current is clamped.

As the resonant frequency of the circuit increases due to the decreasing impedance of the resonant capacitor CR, the voltage applied to the lamp 102 increases until the lamp ignites, i.e., an arc is generated across the lamp terminals. After ignition, the impedance of the lamp 102 is much less than that of the resonant capacitor CR such that substantially all of the current flows through the lamp 102.

If the lamp fails to light, however, the voltage applied to the lamp 102 continues to increase due to the resonant nature of the circuit. After a time, a voltage present on the second bias element LBQ2, which is induced by current flow through the resonant inductive element LR, becomes greater than the threshold voltage associated with the diac DD1. When the diac DD1 becomes conductive, the third switching element Q3 transitions to a conductive state which reduces the signal levels in the circuit by turning Q2 OFF.

While circuit remains OFF, the impedance of the resonant capacitor CR increases as its temperature decreases. When the current through the diac DD1 is no longer sufficient to maintain it in a conductive state, the third switching element Q3 can turn OFF. The circuit again begins to resonate which increases the circuit signal levels so as to cause the impedance of the resonant capacitor CR to decrease. The lamp voltage then increases until the lamp ignites or the lamp voltage exceeds the predetermined level which shuts down the circuit. Thus, the circuit provides a repeating start up sequence that may ultimately ignite a marginally operational lamp, while preventing the generation of potentially destructive signal levels.

When an arc is initiated across the lamp terminals, current flows through the lamp and ultimately through the resistors R2,R3 to the negative rail 116. The lamp current is regulated on a cycle basis via the emitter terminal 148 of Q3, as described above. By clamping the lamp current, the ballast can safely energize a lamp in acoustic resonance. In addition, the average power to the lamp 102 is limited by the rectified voltage on capacitor C1, which turns Q3 ON when the voltage is greater than the zener voltage of DZ1. And the lamp voltage is limited on a cycle basis via the voltage present on the bias element LBQ2.

By limiting the energy applied to the lamp, the ballast allows the lamp to operate in acoustic resonance without the generation of signal levels that could cause the lamp to explode. Although the lamp current will be modulated by the acoustic resonance, which may appear as flickering of the lamp, it will continue to safely emit light.

The below table sets forth exemplary values for circuit components shown in FIG. 3.

| Component | Value |
| --- | --- |
| R1 | 100 Ω |
| R2 | 1 Ω |
| R3 | 10 Ω |
| R4 | 20 Ω |
| R5 | 1 kΩ |
| R6 | 100 Ω |
| R7 | 100 Ω |
| C1 | 0.1 μF |

-continued

| Component | Value |
|---|---|
| C2 | 0.01 μF |
| C3 | 0.1 μF |
| CP1, CP2 | 0.1 μF |
| LR | 2 mH (200 turns) |
| LBQ2 | 2 turns |

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A ballast for energizing a HID lamp, comprising:
a first switching element for supplying a current to a load which includes the lamp;
a first control circuit coupled to the first switching element for controlling a conduction state of the first switching element, the first control circuit including
a second switching element coupled to the first switching element, the second switching element having a first conduction state which causes the first switching element to transition to a non-conductive state and a second conduction state which allows the first switching element to transition to a conductive state; and
a limiting circuit coupled to the second switching element for limiting an amplitude of the load current to a first predetermined level on a cycle basis such that the limiting circuit biases the second switching element to the first conduction state when the amplitude of the load current is greater than the first predetermined level, wherein the limiting circuit limits the load current such that the ballast can drive the lamp in acoustic resonance.

2. A ballast for energizing a HID lamp, comprising:
a first switching element for supplying a current to a load which includes the lamp and a resonant capacitor coupled in parallel with the lamp, said resonant capacitor having a temperature dependent impedance characteristic;
a first control circuit coupled to the first switching element for controlling a conduction state of the first switching element, the first control circuit including
a second switching element coupled to the first switching element, the second switching element having a first conduction state which causes the first switching element to transition to a non-conductive state and a second conduction state which allows the first switching element to transition to a conductive state;
a limiting circuit coupled to the second switching element for limiting an amplitude of the load current to a first predetermined level on a cycle basis such that the limiting circuit biases the second switching element to first conduction state when the amplitude of the load current is greater than the first predetermined level,
wherein prior to ignition of the lamp, the impedance of the resonant capacitor decreases which increases a characteristic frequency of the ballast for increasing a voltage applied to the lamp until an arc is initiated.

3. A ballast circuit for energizing a HID lamp, comprising:
an inverter circuit including
a resonant circuit having a resonant inductive element and a resonant capacitive element which is for coupling in parallel with the lamp, the lamp and the resonant capacitor providing a load, wherein the resonant capacitive element has a temperature dependent impedance, the impedance of the resonant capacitive element decreasing prior to ignition of the lamp so as to increase a voltage applied to the lamp until it ignites;
first and second switching elements coupled to the resonant inductive element;
a first control circuit coupled to the first switching element for controlling a conduction state of the first switching element; and
a second control circuit coupled to the second switching element for controlling a conduction state of the second switching element, the second control circuit including a limiting circuit for limiting energy supplied to the load, the limiting circuit including
a third switching element having a first conduction state which biases the second switching element to a non-conductive state and a second conduction state which allows the second switching element to transition to a conductive state, the limiting circuit limiting a voltage applied to the lamp on a cycle basis to a first predetermined voltage level, wherein the third switching element transitions to the first conduction state when the lamp voltage becomes greater than the first predetermined voltage level.

4. A ballast circuit for energizing a HID lamp, comprising an inverter circuit including
a resonant circuit having a resonant inductive element and a resonant capacitive element which is for coupling in parallel with the lamp, the lamp and the resonant capacitor providing a load, wherein the resonant capacitive element has a temperature dependent impedance;
first and second switching elements coupled to the resonant inductive element;
a first control circuit coupled to the first switching element for controlling a conduction state of the first switching element; and
a second control circuit coupled to the second switching element for controlling a conduction state of the second switching element, the second control circuit including a limiting circuit for limiting energy supplied to the load, the limiting circuit including
a third switching element having a first conduction state which biases the second switching element to a non-conductive state a second conduction state which allows the second switching element to transition to a conductive state, wherein the limiting circuit limits an average voltage applied to the load to a first predetermined average voltage level.

5. A ballast circuit for energizing a HID lamp, comprising an inverter circuit including
a resonant circuit having a resonant inductive element and a resonant capacitive element which is for coupling in parallel with the lamp, the lamp and the resonant capacitor providing a load, wherein the resonant capacitive element has a temperature dependent impedance;
first and second switching elements coupled to the resonant inductive element;

a first control circuit coupled to the first switching element for controlling a conduction state of the first switching element; and a second control circuit coupled to the second switching element for controlling a conduction state of the second switching element, the second control circuit including a limiting circuit for limiting energy supplied to the load, the limiting circuit including a third switching element having a first conduction state which biases the second switching element to a non-conductive state a second conduction state which allows the second switching element to transition to a conductive state, wherein the ballast repeats a start up sequence when the lamp fails to ignite.

6. A ballast for energizing a HID lamp, comprising:

a first switching element for supplying a current to a load which includes the lamp;

a first control circuit coupled to the first switching element for controlling a conduction state of the first switching element, the first control circuit including a second switching element coupled to the first switching element, the second switching element having a first conduction state which causes the first switching element to transition to a non-conductive state and a second conduction state which allows the first switching element to transition to a conductive state; and a limiting circuit coupled to the second switching element for limiting an amplitude of the load current to a first predetermined level on a cycle basis such that the limiting circuit biases the second switching element to the first conduction state when the amplitude of te load current is greater than the first predetermined level, wherein the second switching element is a transistor having an emitter terminal coupled to the first resistor and a load current greater than the first predetermined level biases the transistor to the first conduction state.

7. The ballast according to claim 6, further including a second resistor coupled to the emitter terminal such that the first and second resistors provide a series circuit path for the load current to flow to a negative rail of the ballast.

8. A ballast circuit for energizing a HID lamp, comprising:

an inverter circuit including a resonant circuit having a resonant inductive element and a resonant capacitive element which is for coupling in parallel with the lamp, the lamp and the resonant capacitor providing a load, wherein the resonant capacitive element has a temperature dependent impedance, the impedance of the resonant capacitive element decreasing prior to ignition of the lamp so as to increase a voltage applied to the lamp until it ignites;

first and second switching elements coupled to the resonant inductive element;

a first control circuit coupled to the first switching element for controlling a conduction state of the first switching element; and a second control circuit coupled to the second switching element for controlling a conduction state of the second switching element, the second control circuit including a limiting circuit for limiting energy supplied to the load, the limiting circuit including a third switching element having a first conduction state which biases the second switching element to a non-conductive state and a second conduction state which allows the second switching element to transition to a conductive state, wherein the limiting circuit limits a voltage applied to the lamp on a cycle basis to a first predetermined voltage level, wherein the limiting circuit limits a voltage applied to the lamp on a cycle basis to a first predetermined voltage level.

9. The ballast circuit according to claim 8, wherein the limiting circuit further includes an inductive bias element inductively coupled to the resonant inductive element and coupled to the third switching element.

10. A ballast for energizing a HID lamp, comprising:

a first switching element for supplying a current to a load which includes the lamp, a first control circuit coupled to the first switching element for controlling a conduction state of the first switching element, the first control circuit including a second switching element coupled to the first switching element, the second switching element having a first conduction state which causes the first switching element to transition to a non-conductive state and a second conduction state which allows the first switching element to transition to a conductive state; and a limiting circuit coupled to the second switching element for limiting an amplitude of the load current to a first predetermined level on a cycle basis such that the limiting circuit biases the second switching element to the first conduction state when the amplitude of the load current is greater than the first predetermined level, wherein the limiting circuit limits a voltage applied to the lamp to a third predetermined level on a cycle basis.

11. The ballast according to claim 10, further including a resonant inductive element coupled to the first switching element and an inductive bias element inductively coupled to the resonant inductive element, the bias element biasing the second switching element to the first conduction state when the lamp voltage is greater than the third predetermined level.

12. The ballast according to claim 11, wherein the limiting circuit further includes a diac coupled between the bias element and the second switching element.

13. A ballast circuit for energizing a HID lamp, comprising:

an inverter circuit including a resonant circuit having a resonant inductive element and a resonant capacitive element which is for coupling in parallel with the lamp, the lamp and the resonant capacitor providing a load, wherein the resonant capacitive element has a temperature dependent impedance, the impedance of the resonant capacitive element decreasing prior to ignition of the lamp so as to increase a voltage applied to the lamp until it ignites;

first and second switching elements coupled to the resonant inductive element;

a first control circuit coupled to the first switching element for controlling a conduction state of the first switching element; and a second control circuit coupled to the second switching element for controlling a conduction state of the second switching element, the second control circuit including a limiting circuit for limiting energy supplied to the load, the limiting circuit including a third switching element having a first conduction state which biases the second switching element to a non-conductive state and a second conduction state which allows the second switching element to transition to a conductive state, wherein the limiting circuit limits a voltage applied to the lamp on a cycle basis to a first predetermined voltage level, wherein the limiting circuit limits an amplitude of the load current on a cycle basis to a first pre-determined current level.

14. The ballast circuit according to claim 13, wherein the ballast circuit limits arc instability due to acoustic resonance so as to allow continued lamp operation.

15. The ballast circuit according to claim 13, wherein the limiting circuit further includes a first resistor coupled to the third switching element through which the load current flows.

16. The ballast circuit according to claim 15, wherein the third switching element is a transistor having an emitter terminal coupled to a point between the first resistor and a second resistor, the first and second resistors providing a series circuit path for the load current.

17. A ballast for energizing a HID lamp, comprising:
   a first switching element for supplying a current to a load which includes the lamp,
   a first control circuit coupled to the first switching element for controlling a conduction state of the first switching element, the first control circuit including
      a second switching element coupled to the first switching element, the second switching element having a first conduction state which causes the first switching element to transition to a non-conductive state and a second conduction state which allows the first switching element to transition to a conductive state; and
   a limiting circuit coupled to the second switching element for limiting an amplitude of the load current to a first predetermined level on a cycle basis such that the limiting circuit biases the second switching element to the first conduction state when the amplitude of the load current is greater than the first predetermined level, wherein the limiting circuit limits an average voltage applied to the load to a second predetermined level.

18. The ballast according to claim 17, wherein the limiting circuit further includes a first diode coupled to the first resistor and a first capacitor coupled to the first diode such that the load current is rectified to generate a voltage on the first capacitor.

19. The ballast according to claim 18, wherein the second switching element transitions to the first conduction state when the voltage on the first capacitor corresponds to the second predetermined level.

20. The ballast according to claim 19, wherein the limiting circuit further includes a zener diode having a voltage threshold which corresponds to the second predetermined level.

21. The ballast circuit according to claim 20, wherein the second switching element is a transistor having a base terminal coupled to the zener diode.

22. A ballast circuit for energizing a HID lamp, comprising:
   an inverter circuit including
      a resonant circuit having a resonant inductive element and a resonant capacitive element which is for coupling in parallel with the lamp, the lamp and the resonant capacitor providing a load, wherein the resonant capacitive element has a temperature dependent impedance;
      first and second switching elements coupled to the resonant inductive element;
      a first control circuit coupled to the first switching element for controlling a conduction state of the first switching element; and
      a second control circuit coupled to the second switching element for controlling a conduction state of the second switching element, the second control circuit including a limiting circuit for limiting energy supplied to the load, the limiting circuit including
         a third switching element having a first conduction state which biases the second switching element to a non-conductive state and a second conduction state which allows the second switching element to transition to a conductive state.

23. The ballast circuit according to claim 22, wherein the impedance of the resonant capacitive element decreases prior to ignition of the lamp so as to increase a voltage applied to the lamp until it ignites.

24. The ballast circuit according to claim 22, wherein the limiting circuit limits a post-ignition voltage applied to the lamp.

25. The ballast circuit according to claim 22, wherein the load current primarily flows through the resonant capacitor prior to ignition of the lamp and primarily through the lamp after ignition.

26. A ballast for energizing a HID lamp, comprising:
   a first switching element for supplying a current to a load which includes the lamp;
   a first control circuit coupled to the first switching element for controlling a conduction state of the first switching element, the first control circuit including
      a second switching element coupled to the first switching element, the second switching element having a first conduction state which causes the first switching element to transition to a non-conductive state and a second conduction state which allows the first switching element to transition to a conductive state; and
      a limiting circuit coupled to the second switching element for limiting an amplitude of the load current to a first predetermined level on a cycle basis such that the limiting circuit biases the second switching element to the first conduction state when the amplitude of the load current is greater than the first predetermined level.

27. The ballast according to claim 26, wherein the limiting circuit limits the load current prior to ignition of the lamp.

28. The ballast according to claim 26, wherein the limiting circuit includes a first resistor through which the load current flows.

29. The ballast according to claim 28, wherein the second switching element is a transistor having an emitter terminal coupled to the first resistor.

30. The ballast according to claim 26, wherein the load further includes a resonant capacitor for coupling in parallel with the lamp.

31. The ballast according to claim 30, wherein the resonant capacitor has a temperature dependent impedance characteristic.

32. A method for allowing operation of a HID lamp at or near acoustic resonance, comprising:
   energizing a ballast circuit which includes a first switching element for energizing the lamp having a conduction state controlled by a first control circuit; and
   limiting arc instability by switching said first switching element into a non-conducting state when an amplitude of current to the lamp exceeds a pre-defined threshold during a cycle, thereby limiting an amplitude of current to the lamp on a cycle basis.

33. The method according to claim 32, further including limiting an average voltage to the lamp.

34. The method according to claim 32, further including limiting a voltage to the lamp on a cycle basis.

\* \* \* \* \*